(12) United States Patent
Lee et al.

(10) Patent No.: US 8,483,218 B2
(45) Date of Patent: Jul. 9, 2013

(54) PACKET TRANSPORT LAYER APPARATUS

(75) Inventors: Won Kyoung Lee, Daejeon (KR); Dae Ub Kim, Daejeon (KR); Sang Min Lee, Daejeon (KR); Bhum Cheol Lee, Daejeon (KR)

(73) Assignee: Electronics and Elecommunications Research Institute, Daejeon (KR)

( * ) Notice: Subject to any disclaimer, the term of this patent is extended or adjusted under 35 U.S.C. 154(b) by 729 days.

(21) Appl. No.: 12/611,491

(22) Filed: Nov. 3, 2009

(65) Prior Publication Data

US 2010/0142537 A1 Jun. 10, 2010

(30) Foreign Application Priority Data

Dec. 4, 2008 (KR) .................. 10-2008-0122212
Apr. 24, 2009 (KR) .................. 10-2009-0036030

(51) Int. Cl.
*H04L 12/28* (2006.01)
*H04L 12/56* (2006.01)
*H04J 3/16* (2006.01)
*H04J 3/24* (2006.01)

(52) U.S. Cl.
USPC ............ 370/392; 370/401; 370/466; 370/474

(58) Field of Classification Search
None
See application file for complete search history.

(56) References Cited

U.S. PATENT DOCUMENTS

| | | | |
|---|---|---|---|
| 7,646,778 B2 * | 1/2010 | Sajassi .................... | 370/401 |
| 7,782,856 B1 * | 8/2010 | Larsen et al. ............. | 370/392 |
| 7,965,709 B2 * | 6/2011 | Du ............................ | 370/389 |
| 2006/0120364 A1 * | 6/2006 | Beck et al. ................ | 370/389 |
| 2008/0019385 A1 * | 1/2008 | Sultan et al. ............. | 370/401 |
| 2008/0212595 A1 | 9/2008 | Figueira et al. | |
| 2010/0034118 A1 * | 2/2010 | Saltsidis ................... | 370/254 |

* cited by examiner

*Primary Examiner* — Faruk Hamza
*Assistant Examiner* — Cassandra Decker
(74) *Attorney, Agent, or Firm* — Staas & Halsey LLP

(57) ABSTRACT

There is provided a packet transport layer apparatus. The packet transport layer apparatus can receive frames having different formats via a single port by dividing a single physical port into a plurality of virtual ports according to each frame format, can increase the number of customer virtual local area networks (C-VLANs) and the number of service VLANs (S-VLANs) being usable at the same time by assigning a different component identifier (ID) to each frame format and using the component ID as a factor used in searching a filtering table, and can translate a frame format to be suited to a frame format allocated to a virtual output port.

5 Claims, 17 Drawing Sheets

PACKET TRANSPORT LAYER APPARATUS

CROSS-REFERENCE TO RELATED APPLICATIONS

This application claims the priorities of Korean Patent Application Nos. 10-2008-0122212 filed on Dec. 4, 2008, and 10-2009-0036030 filed on Apr. 24, 2009 in the Korean Intellectual Property Office, the disclosures of which are incorporated herein by reference.

BACKGROUND OF THE INVENTION

1. Field of the Invention

The present invention relates to a packet transport layer apparatus, and more particularly, to a packet transport layer apparatus, which can receive frames having different formats via a single port by dividing a single physical port into a plurality of virtual ports according to each frame format, can increase the number of customer virtual local area networks (C-VLANs) and the number of service VLANs (S-VLANs) being usable at the same time by assigning a different component identifier (ID) to each frame format and using the component ID as a factor used in searching a filtering table, and can translate a frame format to be suited to a frame format allocated to a virtual output port.

2. Description of the Related Art

A packet transport layer, such as transport-multiprotocol label switching (T-MPLS) or provider backbone bridge traffic engineering (PBB-TE), is a packet-based transport layer that receives various Ethernet frames. Specifically, packets are delivered from Ethernet networks in the form of untagged frames, which are basic Ethernet frames, and C-tag frames tagged with virtual local area network (VLAN) tags in 802.1Q. Also, packets from provider bridge networks are delivered in the form of S-tag frames in 802.1ad, and packets from backbone core networks are delivered in the form of B-tag frames in 802.1ah. The edge of a packet transport layer accesses the Ethernet network and the provider bridge network and connects them to the backbone core network. Therefore, the ingress of the packet transport layer needs to translate Ethernet frames (i.e., untagged frames and c-tag frames) and S-tag frames into B-tag frames. In addition, the egress of the packet transport layer needs to translate B-tag frames into Ethernet frames or S-tag frames.

In the packet transport layer according to the related art, a different physical port is allocated to each frame format. Namely, the related art packet transport layer renders only one frame format accessible to a single physical port, and this is disadvantageous in that the Ethernet network and the provider bridge network cannot be connected to the same physical port.

A VLAN identifier (ID) contains 12 bits, and as many as 4096 VLAN IDs may exist in principle. However, the sum of customer VLAN IDs (C-VIDs) and service VLAN IDs (S-VIDs) reaches as many as 4096, and the C-VIDs and the S-VIDs cannot respectively number 4096 in the event that the related art packet transport layer accesses an Ethernet network and a provider bridge network at the same time and uses both C-VIDs and S-VIDs.

SUMMARY OF THE INVENTION

An aspect of the present invention provides a packet transport layer apparatus which can receive frames having different formats via a single port by dividing a single physical port into a plurality of virtual ports according to each frame format, can increase the number of C-VLANs and the number of S-VLANs being usable at the same time by assigning a different component identifier (ID) to each frame format and using the component ID as a factor used in searching a filtering table, and can translate a frame format to be suited to a frame format allocated to a virtual output port.

According to an aspect of the present invention, there is provided a packet transport layer apparatus including: an I-component ingress receiving frames having different formats via a single customer network port (CNP), assigning a component identifier (ID) to a received frame according to a format of the received frame, and then outputting an I-tag frame via a virtual output port by encapsulating the received frame with an I-tag; a B-component ingress outputting a B-tag frame via provider network port (PNP) by encapsulating, with a B-tag, the I-tag frame received from the I-component ingress via a virtual input port; a B-component egress translating a B-tag frame, received via a PNP, into an I-tag frame by removing a B-tag, and then outputting the I-tag frame via a virtual output port; and an I-component egress removing an I-tag from the I-tag frame received from the B-component egress via a virtual input port, assigning a component ID to the I-tag removed frame according to a format of the I-tag removed frame, translating a format of the I-tag removed frame according to the component ID and a T-component ID, and outputting the format-translated frame via a CNP.

The I-component ingress may include: a frame classification part classifying a frame, received via the CNP, according to a format of the frame, and forwarding the frame to any one of a customer virtual local area network (C-VLAN) aware I-component search part, an un-aware I-component search part and a service virtual LAN (S-VLAN) aware I-component search part; the C-VLAN aware I-component search part receiving a C-tag frame from the frame classification part and assigning a C-VLAN aware I-component to the C-tag frame as a component ID, receiving a C-tag frame tagged with a default VLAN ID from the un-aware I-component search part, and acquiring information about a virtual output port by searching a filtering table; the un-aware I-component search part receiving an untagged frame from the frame classification part, assigning an un-aware I component to the untagged frame as a component ID, and allocating a default VLAN ID thereto as a C-VLAN ID (C-VID); the S-VLAN aware I-component search part receiving an S-tag frame from the frame classification part, assigning an S-VLAN aware I-component to the S-tag frame as a component ID, and acquiring information about a virtual output port by searching the filtering table; and an I-tag encapsulation part creating an I-tag, and tagging a frame with the I-tag, the frame being received from the C-VLAN aware I-component search part or the S-VLAN aware I-component search part.

The B-component ingress may include: a B-component search part acquiring information about a virtual output port for the I-tag frame by searching a filtering table; a B-tag encapsulation part creating a B-tag, and outputting a B-tag frame via a virtual output port by tagging, with the B-tag, the I-tag frame received from the B-component search part; and a frame tag translation/integration part acquiring information about a physical output port corresponding to the virtual output port by searching a port table, and then outputting the B-tag frame, received from the B-tag encapsulation part, via the physical output port.

The B-component egress may include: a B-component search part acquiring information about a virtual output port for a B-tag frame by searching a filtering table; and a B-tag removal part outputting an I-tag frame via the virtual output port by removing a B-tag from the B-tag frame received from the B-component search part.

The I-component egress may include: an I-tag removal part removing an I-tag from the received I-tag frame; a frame classification part classifying the frame received from the I-tag removal part according to a format of the frame, and forwarding the frame to a customer virtual local aware network (C-VLAN) aware I-component search part or a service virtual LAN (S-VLAN) aware I-component search part; the C-VLAN aware I-component search part receiving a C-tag frame from the frame classification part, assigning a C-VLAN aware I-component to the C-tag frame as a component ID, and acquiring information about a virtual output port by searching a filtering table; the S-VLAN aware I-component search part receiving an S-tag frame from the frame classification part, assigning an S-VLAN aware I-component to the S-tag frame as a component ID, and acquiring information about a virtual output port by searching the filtering table; and a frame tag translation/integration part receiving the C-tag frame or the S-tag frame from the C-VLAN aware I-component search part or the S-VLAN aware I-component search part, acquiring information about a T-component ID and a physical output port by searching a port table, translating a format of the C-tag frame or the S-tag frame according to the component ID and the T-component ID, and outputting the format-translated frame.

The frame tag translation/integration part may output the received frame without translating a format of the frame when the T-component ID is zero. In the case that the component ID is an S-VLAN aware I-component, the frame tag translation/integration part may translate the received frame into a C-tag frame and output the C-tag frame when the T-component ID is a C-VLAN aware I-component, and may translate the received frame into an untagged frame and output the untagged frame when the T-component ID is not a C-VLAN aware I-component. In the case that the component ID is a C-VLAN aware I-component, the frame tag translation/integration part may translate the received frame into an S-tag frame and output the S-tag frame when the T-component ID is an S-VLAN aware I-component, and may translate the received frame into an untagged frame and output the untagged frame when the T-component ID is not an S-VLAN aware I-component.

The filtering table may include a component ID field, and have information about a physical output port or a virtual output port in a port number field. The component ID may serve as a search factor used in searching the filtering table.

The port table may store a mapping relation between the virtual output port and the physical output port, and include a T-component ID field indicating information associated with a frame format to be translated.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
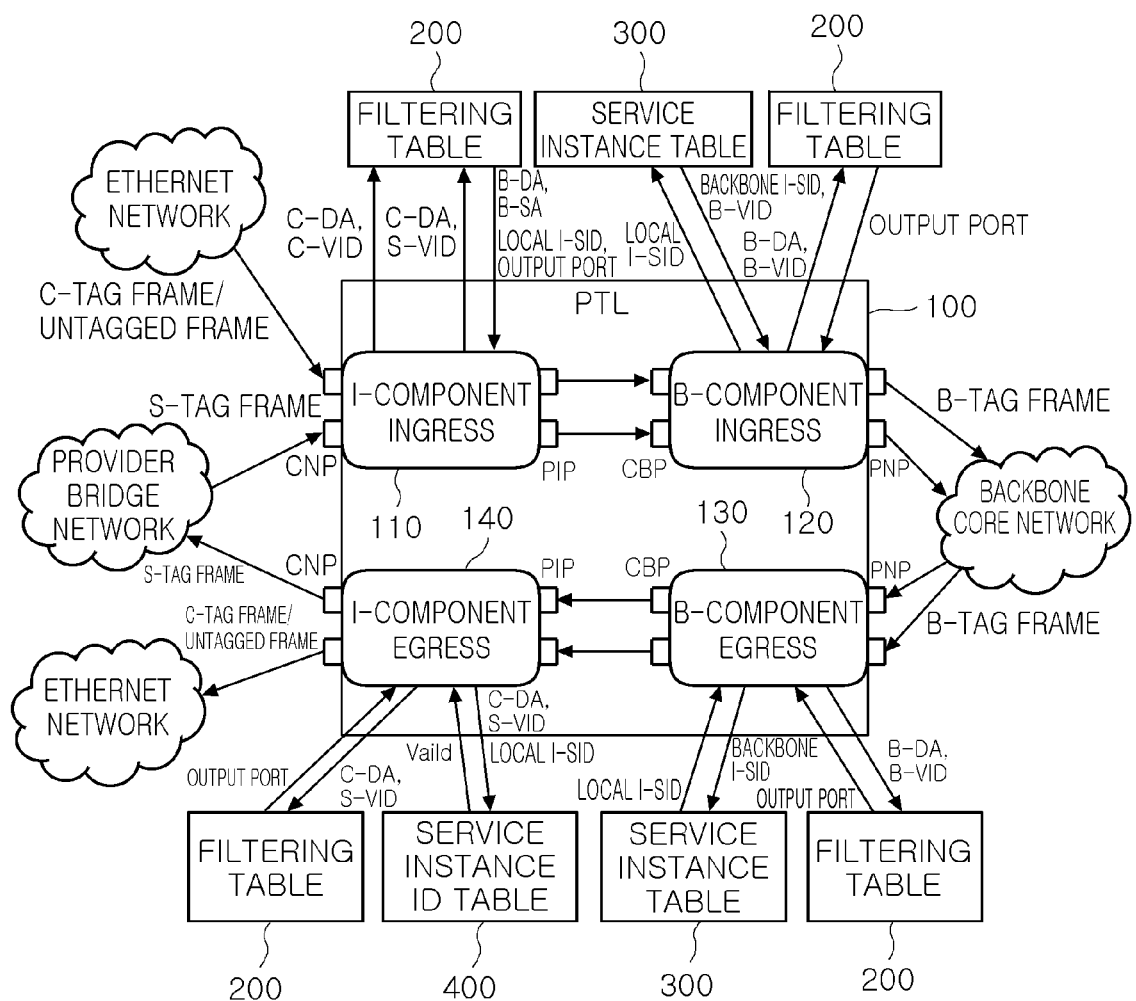
FIG. 1 is a configuration view illustrating a related art packet transport layer adopting a PBB-TE technology.

Exemplary embodiments of the present invention will now be described in detail with reference to the accompanying drawings. The invention may, however, be embodied in many different forms and should not be construed as limited to the embodiments set forth herein. Rather, these embodiments are provided so that this disclosure will be thorough and complete, and will fully convey the scope of the invention to those skilled in the art. Moreover, detailed descriptions related to well-known functions or configurations will be ruled out in order not to unnecessarily obscure subject matters of the present invention. Like reference numerals in the drawings denote like elements.

In the description of embodiments, it should be understood that when an element is referred to as being "connected to" another element, it can be connected directly to the other element, or intervening elements may also be present. In addition, unless explicitly described to the contrary, the words "include" or "comprise" and variations such as "includes", "including", "comprises" or "comprising" will be understood to imply the inclusion of stated elements but not the exclusion of any other elements.

FIG. 1 is a configuration view illustrating a related art packet transport layer (PTL) adopting a PBB-TE technology.

As shown in FIG. 1, a packet transport layer 100 includes I-components 110 and 140, and B-components 120 and 130.

The I-components 110 and 140 include an I-component ingress 110 and an I-component egress 140. The I-component ingress 110 generates I-tag frames by assigning backbone service instance identifiers (I-SIDs) to C-tag frames, untagged frames and S-tag frames. Here, the C-tag frames and the untagged frames are inputted via a customer network port (CNP) connected to an Ethernet network, and the S-tag frames are inputted via a CNP connected to a provider bridge network. Thereafter, the I-component ingress 110 outputs the I-tag frames to a B-component ingress 120 via a provider instance port (PIP). The I-component egress 140 translates I-tag frames inputted from a B-component egress 130, into C-tag frames, untagged frames or S-tag frames by removing I-tags from the inputted I-tag frames. Thereafter, the I-component egress 140 outputs the C-tag frames, the untagged frames or the S-tag frames to the Ethernet network or the provider bridge network via a CNP.

The B-components 120 and 130 include the B-component ingress 120 and the B-component egress 130. The B-component ingress 120 generates B-tag frames by assigning B-VLAN IDs (B-VIDs) to I-tag frames inputted from the I-component ingress 110 via customer backbone ports (CBPs), and thereafter, outputs the B-tag frames to a backbone core network via provider network ports (PNPs). The B-component egress 130 translates B-tag frames, inputted via PNPs connected to the backbone core network, into I-tag frames by removing B-tags from the inputted B-tag frames, and thereafter, outputs the I-tag frames to the I-tag component egress 140.

The following Tables 1 through 3 respectively represent a filtering table 200, a service instance table 300, and a service instance ID table 400 used in the packet transport layer 100 by the I-components 110 and 140 and the B-components 120 and 130.

TABLE 1

| Field name | Description | |
| --- | --- | --- |
| DA | I-component Ingress/Egress | C-DA |
|  | B-component Ingress/Egress | B-DA |
| VLAN ID | I-component Ingress/Egress (C-tag Frame) | C-VID |
|  | I-component Ingress/Egress (S-tag Frame) | S-VID |
|  | B-component Ingress/Egress (B-tag Frame) | B-VID |
| Port Number | Output Port Number | |
| B-DA | Backbone Destination MAC Address | |
| I-SID | Local I-SID | |
| B-VID | B-VID Substitution | |
| FLOW ID | Flow Number | |
| Direction | I-component Ingress/I-component Egress | |
|  | B-component Ingress/B-component Egress | |
| Valid | 1 (Valid)/0 (Free) | |

TABLE 2

| Field Name | Description | |
| --- | --- | --- |
| I-SID | B-component Ingress | Local I-SID |
|  | B-component Egress | Backbone I-SID |
| B-VID | Backbone VLAN ID | |
| TI-SID | B-component Ingress | Backbone I-SID |
|  | B-component Egress | Local I-SID |
| Flow ID | Flow Number | |
| Direction | B-component Ingress/B-component Egress | |
| Valid | 1 (Valid)/0 (Free) | |

TABLE 3

| Field Name | Description | |
| --- | --- | --- |
| C-DA | C-DA | |
| VLAN ID | C-tag Frame | C-VID |
|  | S-tag Frame | S-VID |
| I-SID | Local I-SID | |
| Valid | 1 (Valid)/0 (Free) | |

Prior to the description of a packet transport layer apparatus and a packet processing method according to the present invention, tag types representing Ethernet types, and a frame format for each tag type will now be described.

Table 4 shows the types and values of tags respectively representing Ethernet types defined in IEEE 802.1 standards.

TABLE 4

| Tag Type | Description | Value |
| --- | --- | --- |
| C-VLAN Tag | 802.1Q Tag Protocol Type (802.1Q Tag Type) | 8100 |
| S-VLAN Tag/ B-VLAN Tag | 802.1Q Service Tag Type (802.1QS Tag Type) | 88a8 |
| Backbone Service Instance Tag | 802.1Q Backbone Service Instance Tag Type (802.1QI Tag Type) | 88e7 |

Frame formats are classified by Ethernet type, as shown in Table 4 above. Namely, a C-tag frame has a Tag Protocol ID (TPID) value of 8100(hex), an S-tag frame and a B-tag frame have TPID values of 88a8 (hex), and an I-tag frame has a TPID value of 88e7(hex). An untagged frame has a TPID value of 0800(Hex).

FIGS. 2A through 2D illustrate the formats of frames according to tag types, respectively.

Figure 2A:
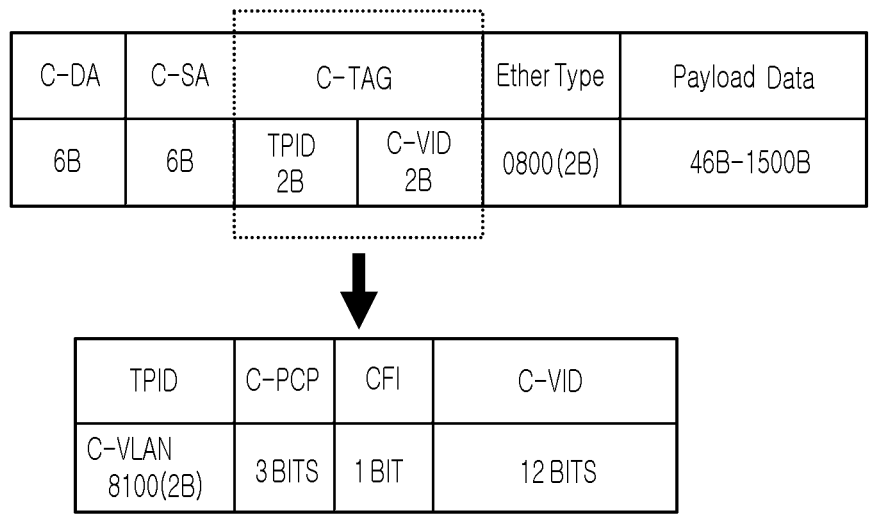
FIGS. 2A through 2D illustrate frame formats by tag type, respectively

FIG. 2A illustrates the format of a C-tag frame. A C-tag contains a tag protocol ID (TPID) having a value of 8100 (hex), a C-priority code point (C-PCP) indicating a priority, a canonical format identifier (CFI) indicating whether or not a corresponding C-tag frame has a standard format, and a C-VLAN ID (C-VID).

Figure 2B:
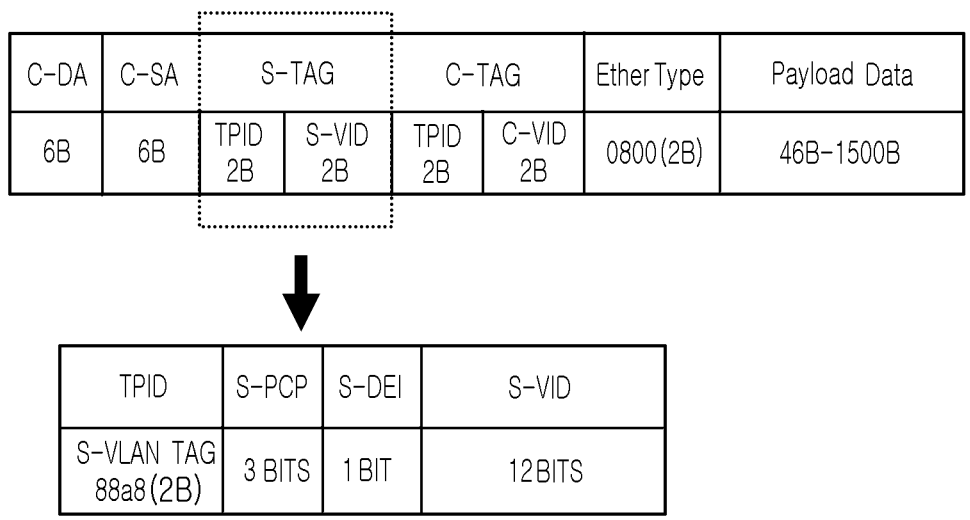

FIG. 2B illustrates the format of an S-tag frame. An S-tag is located between a customer source MAC address (C-SA) and a C-tag, and contains a TPID having a value of 88a8(hex), an S-PCP indicating a priority, an S-Drop Eligible Indicator (DEI) indicating whether or not the S-tag frame is discarded, and an S-VLAN ID (S-VID).

Figure 2C:
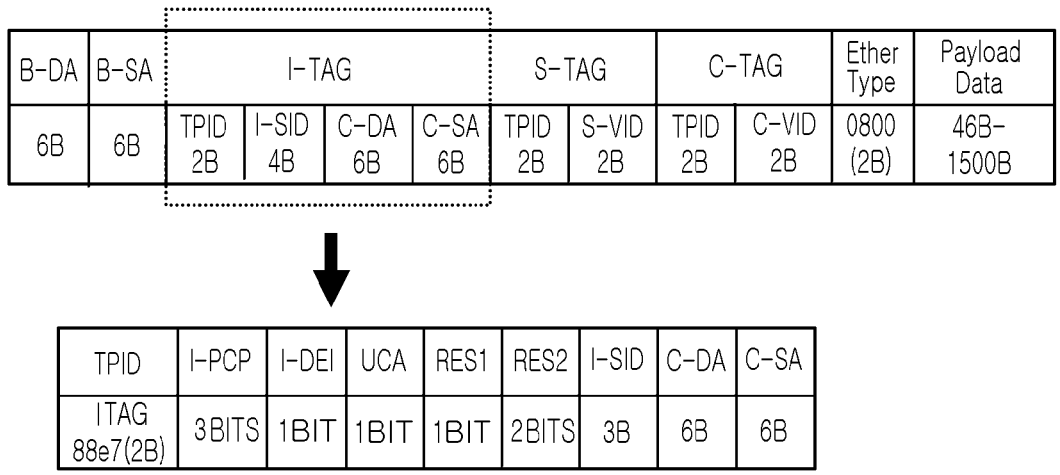

FIG. 2C illustrates the format of an I-tag frame. An I-tag is located between a backbone source MAC address (B-SA) and an S-tag, and contains a TPID having a value of 88e7(hex), an I-PCP indicating a priority, an I-DEI indicating whether or not the I-tag frame is discarded, a use customer address (UCA) indicating whether or not a customer address is used, an a backbone service instance identifier (I-SID), a customer destination MAC address (C-DA) and a customer source MAC address (C-SA).

Figure 2D:
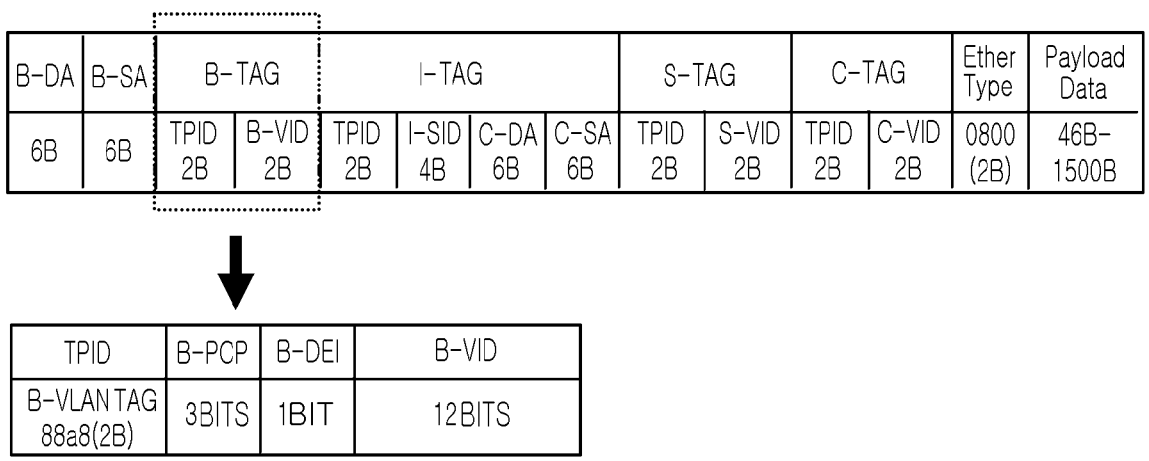

FIG. 2D illustrates the format of a B-tag frame. AB-tag is located between a B-SA and an I-tag, and contains a TPID having a value of 88a8(hex), a B-PCP indicating a priority, a B-DEI indicating whether or not the B-tag frame is discarded, and a B-VLAN ID (B-VID).

An untagged frame refers to a pure Ethernet frame without a C-tag.

Figure 3:
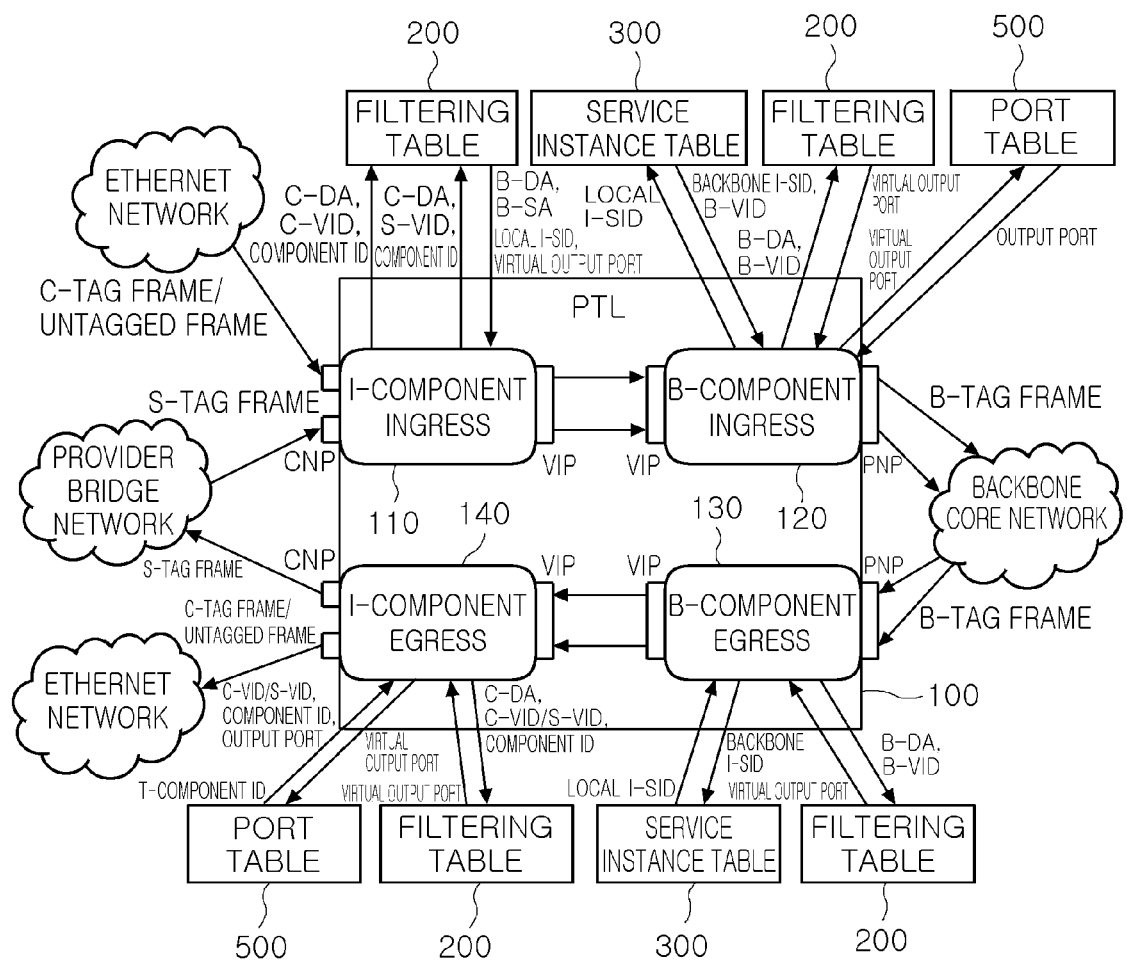
FIG. 3 is a configuration view illustrating a packet transport layer apparatus according to an exemplary embodiment of the present invention.

FIG. 3 is a configuration view illustrating a packet transport layer according to an exemplary embodiment of the present invention.

Referring to FIG. 3, a packet transport layer 100 includes an I-component ingress 110, a B-component ingress 120, a B-component egress 130, and an I-component egress 140. The I-component ingress 110 receives frames having different formats via a single CNP, assigns a component ID to a received frame according to the format of the frame, encapsulates the frame with an I-tag, and thus outputs an I-tag frame via a virtual output port. The B-component ingress 120 receives the I-tag frame from the I-component ingress 110 via a virtual input port, encapsulates the I-tag frame with a B-tag, and thus outputs a B-tag frame via a PNP. The B-component egress 130 receives a B-tag frame via a PNP, translates the B-tag frame into an I-tag frame by removing a B-tag, and outputs the I-tag frame via a virtual output port. The I-component egress 140 receives the I-tag frame from the B-component egress 130 via a virtual input port, removes an I-tag from the I-tag frame, then assigns a component ID to the I-tag removed frame according to the format of the frame, translates the format of the frame according to the component ID and a T-component ID value, and outputs the format-translated frame via a CNP.

FIGS. 4A through 4D are detailed configuration views illustrating a packet transport layer apparatus according to an exemplary embodiment of the present invention. FIGS. 4A through 4D illustrate the configurations of the I-component ingress, the B-component ingress, the B-component egress and the I-component egress in detail, respectively.

Figure 4A:
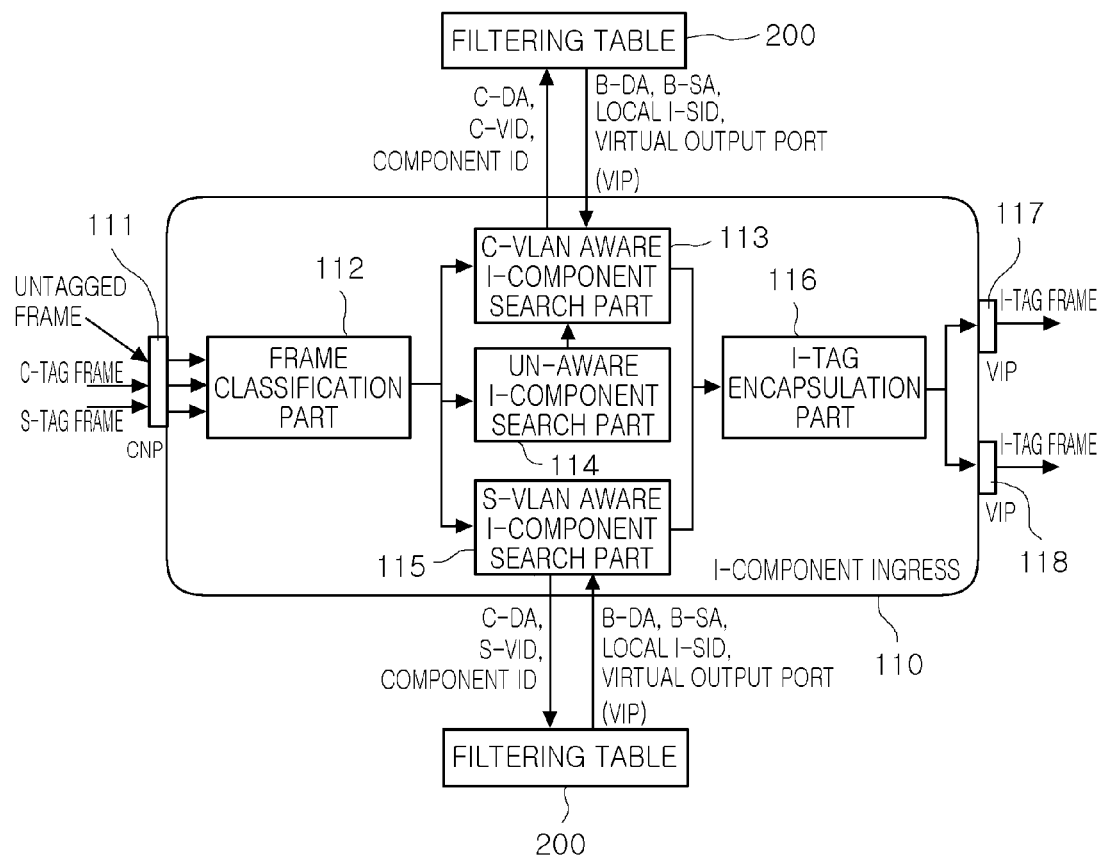
FIGS. 4A through 4D are detailed configuration views illustrating a packet transport layer apparatus according to an exemplary embodiment of the present invention.

Referring to FIG. 4A, the I-component ingress 110 includes a frame classification part 112, a C-VLAN aware I-component search part 113, an un-aware I-component search part 114, an S-VLAN aware I-component search part 115, and an I-tag encapsulation part 116.

The frame classification part 112 classifies frames having different formats inputted via a single CNP 111, and forwards the frames to any one of the C-VLAN aware I-component search part 113, the un-aware I-component search part 114 and the S-VLAN aware I-component search part 115. In detail, the frame classification part 112 extracts a TPID value, a VLAN ID and a C-DA from the tag of an inputted frame, classifies the frame by format using the TPID value, and respectively forwards a C-tag frame, an S-tag frame and an untagged frame to the C-VLAN aware I-component search part 113, the S-VLAN aware I-component search part 115, and the un-aware I-component search part 114.

The C-VLAN aware I-component search part 113 receives a C-tag frame from the frame classification part 112, and assigns a C-VLAN aware I-component to the C-tag frame as a component ID. In addition, the C-VLAN aware I-component search part 113 receives a C-tag frame containing a default C-VID and a component ID assigned by the un-aware I-component search part 114. Thereafter, the C-VLAN aware I-component search part 113 searches a filtering table 200 using the C-DA, the C-VID and the component ID to thereby acquire information about a B-DA, a B-SA, a local I-SID and a virtual output port required for translating the C-tag frame into an I-tag frame.

The un-aware I-component search part 114 receives an untagged frame from the frame classification part 112, assigns an un-aware I-component to the untagged frame as a component ID, allocates a default VLAN ID to the untagged frame as a C-VID, and then forwards it to the C-VLAN aware I-component search part 113.

The S-VLAN aware I-component search part 115 receives an S-tag frame from the frame classification part 112, and assigns an S-VLAN aware I-component to the S-tag frame as a component ID. Thereafter, the S-VLAN aware I-component search part 115 searches a filtering table 200 using the C-DA, S-VID and component ID to thereby acquire information about a B-DA, a B-SA, a local I-SID and a virtual output port required for translating the S-tag frame into an I-tag frame.

As described above, a component ID by tag type is added as a factor to acquire information needed for the generation of I-tag frames. Hence, C-VIDs and S-VIDs, although having identical values, are mapped as different entries in the filtering tables 200. This allows the number of C-VIDs and the number of S-VIDs to reach as many as 4096, respectively. To this end, the configuration of the filtering table 200 needs to be modified, and this will be described later in detail.

The I-tag encapsulation part 116 receives a C-tag frame or an S-tag frame from the C-VLAN aware I-component search part 113 or the S-VLAN aware I-component search part 115, and creates an I-tag by using information acquired by searching the filtering table 200. Thereafter, the I-tag encapsulation part 116 tags (i.e., encapsulates) the received frame with the created I-tag to thereby output an I-tag frame to virtual output ports 117 and 118. According to this embodiment, the concept of virtual output ports is applied to an output port, so that frames having different formats can be received by a single physical port.

Figure 4B:
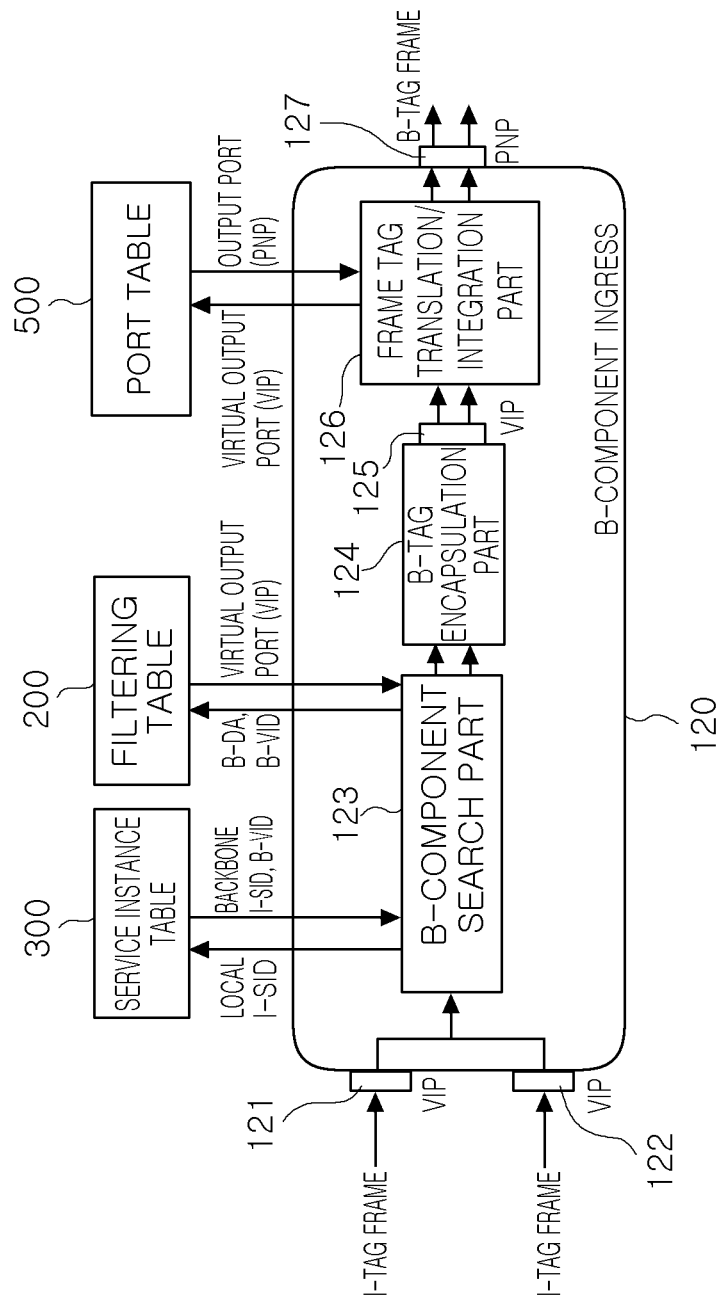

Referring to FIG. 4B, the B-component ingress 120 includes a B-component search part 123, a B-tag encapsulation part 124, a frame tag translation/integration part 126.

The B-component search part 123 extracts a local I-SID and a B-DA from an I-tag frame received via virtual ports 121 and 122. Thereafter, the B-component search part 123 acquires a backbone I-SID and a B-VID by searching the service instance table 300 using the local I-SID. In addition, the B-component search part 123 acquires information about virtual output ports by searching the filtering table 200 using the B-DA and the B-VID. Here, the service instance table depicted in the above Table 2 for the related art packet transport layer apparatus may be used without being modified, as in the service instance table 300 of this embodiment.

The B-tag encapsulation part 124 substitutes the local I-SID of the I-tag frame, received via the virtual ports 121 and 122, with the backbone I-SID acquired by the B-component search part 123, and then creates a B-tag. Thereafter, the B-tag encapsulation part 124 tags the received I-tag frame with the created B-tag, and thus, outputs a B-tag frame via a virtual output port 125.

The frame tag translation/integration part 126 acquires information about a physical output port (PNP) by searching a port table 500 using the information about virtual output ports. Thereafter, the frame tag translation/integration part 126 outputs the B-tag frame, received from the B-tag encapsulation part 124, to a backbone core network via a physical output port (PNP) 127. Here, the port table 500 is a novel table introduced in the present invention, and will be described later in detail.

Figure 4C:
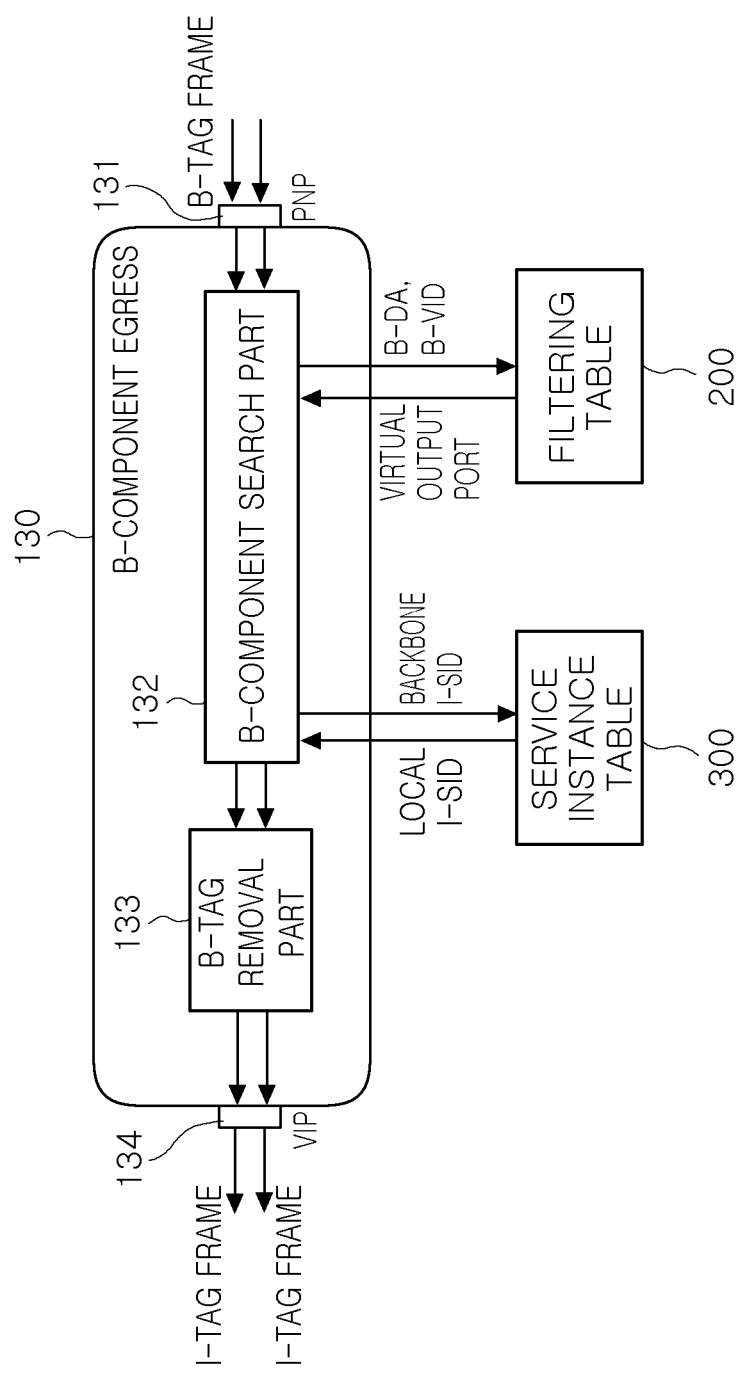

Referring to FIG. 4C, the B-component egress 130 includes a B-component search part 132, and a B-tag removal part 133.

The B-component search part 132 receives a B-tag frame from the backbone core network via a PNP 131, and extracts a backbone I-SID, a B-DA and a B-VID from the received B-tag frame. Thereafter, the B-component search part 132 acquires information about virtual output ports (VIP) by searching the filtering table 200 using the B-DA and the B-VID, and acquires a local I-SID by searching the service instance table 300 using the backbone I-SID.

The B-tag removal part 133 substitutes the backbone I-SID of the B-tag frame, received via the PNP 131, with the local I-SID acquired by the B-component search part 132, translates the received B-tag frame into an I-tag frame by removing a B-tag, and then outputs the I-tag frame via a virtual output port (VIP) 134.

Figure 4D:
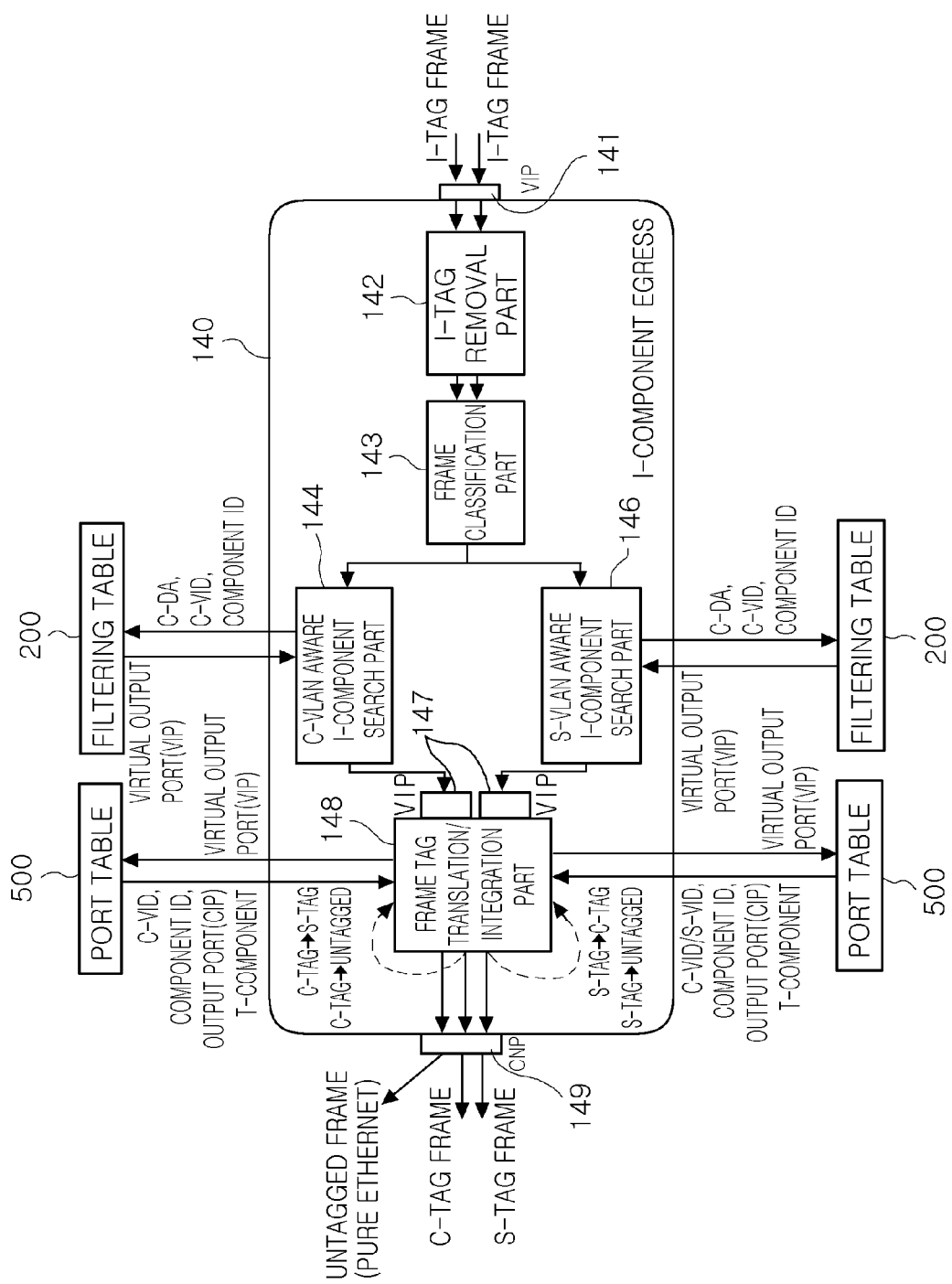

Referring to FIG. 4D, the I-component egress 140 includes an I-tag removal part 142, a frame classification part 143, a C-VLAN aware I-component search part 144, an S-VLAN aware I-component search part 146, and a frame tag translation/integration part 148.

The I-tag removal part 142 removes an I-tag from the I-tag frame inputted via a VIP 141, and then forwards it to the frame classification part 143.

The frame classification part 143 extracts a TPID value, a VLAN ID and a C-DA from the tag of the received frame, and classifies the frame by format using the TPID value. When determined to be a C-tag frame, the received frame is forwarded to the C-VLAN aware I-component search part 144. When determined to be an S-tag frame, the received frame is forwarded to the S-VLAN aware I-component search part 146.

The C-VLAN aware I-component search part 144 receives the C-tag frame from the frame classification part 143, and assigns a C-VLAN aware I-component to the C-tag frame as a component ID. Thereafter, the C-VLAN aware I-component search part 144 acquires information about virtual output ports by searching the filtering table 200 using the C-DA, the C-VID and the component ID.

The S-VLAN aware I-component search part 146 receives the S-tag frame from the frame classification part 143, and assigns an S-VLAN aware I-component to the S-tag frame as a component ID. Thereafter, the S-VLAN aware I-component search part 146 acquires information about virtual output ports by searching the filtering table 200 using the C-DA, the S-VID and the component ID.

The frame tag translation/integration part 148 receives the C-tag frame or the S-tag frame via a virtual port 147 from the C-VLAN aware I-component search part 144 or the S-VLAN aware I-component search part 146. Thereafter, the frame tag translation/integration part 148 acquires information about a default VLAN ID, a component ID, a T-component ID and a corresponding output port (CNP) by searching the port table 500 using the information about virtual output ports.

The frame tag translation/integration part 148 converts the format of the received C-tag or S-tag frame properly according to the component ID and the T-component ID, and outputs the converted frame via an output port 149. The translation of the frame format will be described later with reference to FIG. 6E.

According to the present invention, the filtering table 200, the service instance table 300 and the port table 500 are used by the packet transport layer apparatus.

As for the service instance table 300, the service instance table as shown in Table 2 for the related art packet transport layer apparatus is used as it is without any modifications.

The filtering table 200, as shown in Table 5 below, is a partial modification of the related art filtering table. In detail, the filtering table 200 used in the present invention is different from the related art filtering table in that a Port Number field contains not only information about a physical output port but also information about a virtual output port, and a novel field named "Component ID" is added.

TABLE 5

| Field name | Description | |
| --- | --- | --- |
| DA | I-component Ingress/Egress | C-DA |
| | B-component Ingress/Egress | B-DA |
| VLAN ID | I-component Ingress/Egress (C-tag Frame) | C-VID |
| | I-component Ingress/Egress (S-tag Frame) | S-VID |
| | B-component Ingress/Egress (B-tag Frame) | B-VID |
| Port Number | Virtual Output Port Number or Physical Output Port Number | |
| B-DA | Backbone Destination MAC Address | |
| I-SID | Local I-SID | |
| B-VID | B-VID Substitution | |
| FLOW ID | Flow Number | |
| Direction | I-component Ingress/I-component Egress | |
| | B-component Ingress/B-component Egress | |
| Component ID | Un-aware I-component | |
| | C-VLAN Aware I-component | |
| | S-VLAN Aware I-component | |
| | B-component | |
| Valid | 1 (Valid)/0 (Free) | |

In addition, the port table 500 is a novel table introduced in the present invention in order to indicate mapping relations between virtual ports and physical ports. The port table 500 has a configuration as shown in Table 6 below. Here, a "T-component ID" field is to indicate information associated with a frame format to be translated when the frame is outputted.

TABLE 6

| Field name | Description | |
| --- | --- | --- |
| Virtual Port | Virtual Output Port Number/Virtual Input Port Number | |
| VLAN ID | I-component Ingress/Egress (C-tag Frame) | C-VID |
| | I-component Ingress/Egress (S-tag Frame) | S-VID |
| | B-component Ingress/Egress (B-tag Frame) | B-VID |
| Physical Port | Physical Output Port Number | |
| | Physical Input Port Number | |
| FLOW ID | Flow Number | |
| Direction | I-component Ingress/I-component Egress | |
| | B-component Ingress/B-component Egress | |

TABLE 6-continued

| Field name | Description |
| --- | --- |
| Component ID | Un-aware I-component |
| | C-VLAN Aware I-component |
| | S-VLAN Aware I-component |
| | B-component |
| T-component ID | Translated Component ID |
| Valid | 1 (Valid)/0 (Free) |

FIGS. 5A through 5D are detailed configuration views illustrating a packet transport layer apparatus according to another exemplary embodiment of the present invention. FIGS. 5A through 5D illustrate the configurations of an I-component ingress, a B-component ingress, a B-component egress, and an I-component egress, respectively.

Unlike the embodiment depicted in FIGS. 4A through 4D, the embodiment depicted in FIGS. 5A through 5D adopts the concept of component IDs, without adopting the concept of virtual ports. Thus, this embodiment is partially different in configuration from the previous embodiment, and therefore its description will be made focused mainly on the differences from the previous embodiment.

Figure 5A:
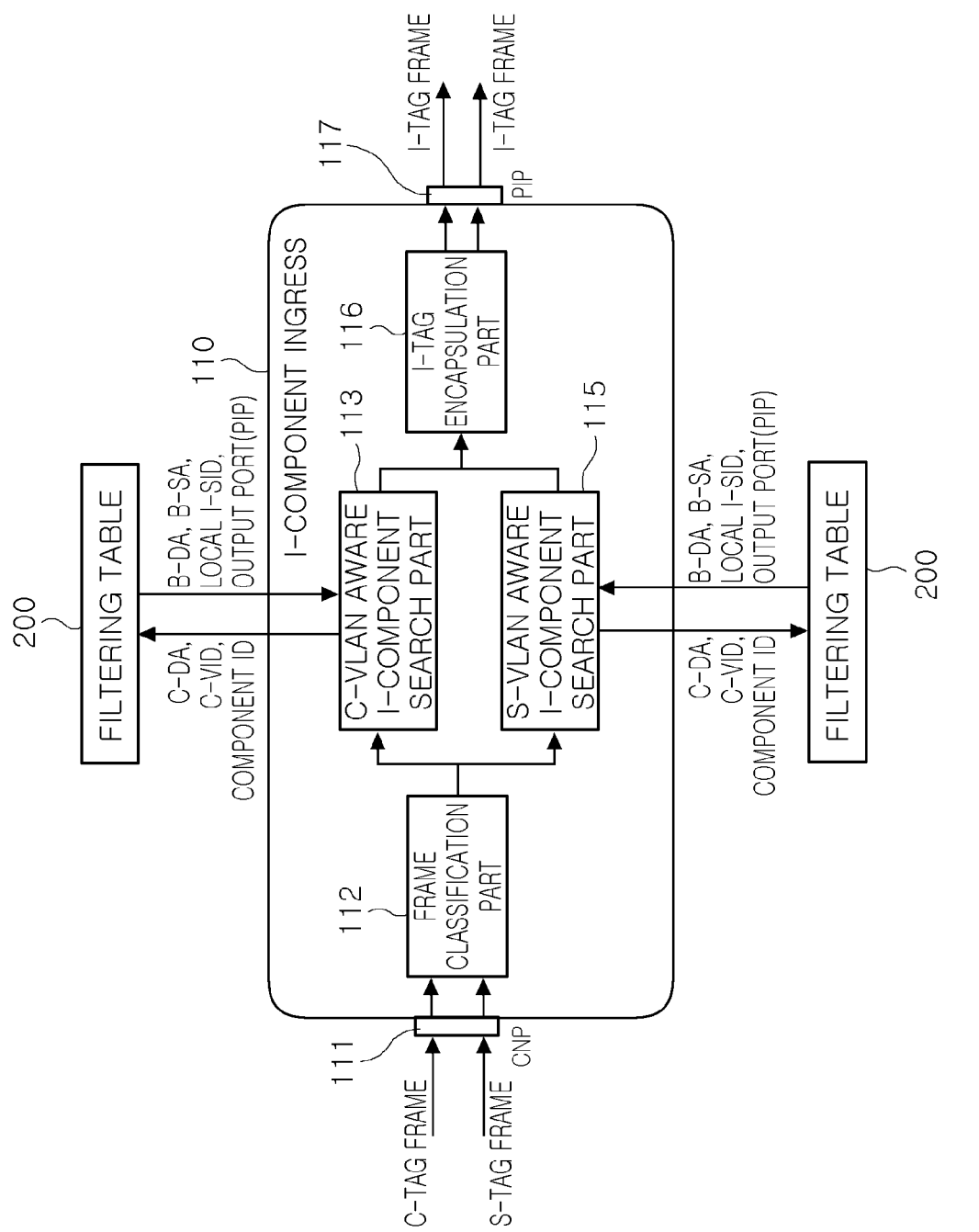
FIGS. 5A through 5D are detailed configuration views illustrating a packet transport layer apparatus according to another exemplary embodiment of the present invention.

Referring to FIG. 5A, the I-component ingress 110 does not include a separate un-aware I-component search part serving to allocate a component ID and a VLAN ID to an untagged frame. In this I-component ingress 110, the C-VLAN aware I-component search part 113 functions also as the un-aware I-component search part of the previous embodiment. In addition, the I-component ingress 110 outputs frames via a physical port (PIP), not via a virtual port.

In detail, the frame classification part 112 classifies an inputted frame by format, using a TPID value extracted from the inputted frame. Thereafter, the frame classification part 112 forwards a C-tag frame and an untagged frame to the C-VLAN aware I-component search part 113, and forwards an S-tag frame to the S-VLAN aware I-component search part 115.

The C-VLAN aware I-component search part 113 receives a C-tag frame from the frame classification part 112, and assigns a C-VLAN aware I-component to the C-tag frame as a component ID. In addition, the C-VLAN aware I-component search part 113 receives an untagged frame from the frame classification part 112, assigns an un-aware I-component to the untagged frame as a component ID, and allocates a default VLAN ID thereto as a C-VID. Thereafter, the C-VLAN aware I-component search part 113 searches the filtering table 200 using a C-DA, the C-VID and the component ID, thereby acquiring information about a B-DA, an B-SA, a local I-SID and a physical output port (PIP) required for translating the C-tag frame into an I-tag frame.

The S-VLAN aware I-component search part 115 receives an S-tag frame from the frame classification part 112, and assigns an S-VLAN aware I-component to the S-tag frame as a component ID. Thereafter, the S-VLAN aware I-component search part 115 searches the filtering table 200 using a C-DA, an S-VID and the component ID, thereby acquiring information about a B-DA, a B-SA, a local I-SID and a physical output port (PIP) required for translating the S-tag frame into an I-tag frame.

The I-tag encapsulation part 116 receives a C-tag frame or an S-tag frame from the C-VLAN aware I-component search part 113 or the S-VLAN aware I-component search part 115, and creates an I-tag by using the information acquired by searching filtering table 200. Thereafter, the I-tag encapsulation part 116 tags (encapsulates) the received C-tag or S-tag frame with the created I-tag, and outputs the tagged frame via a physical port 117.

Figure 5B:
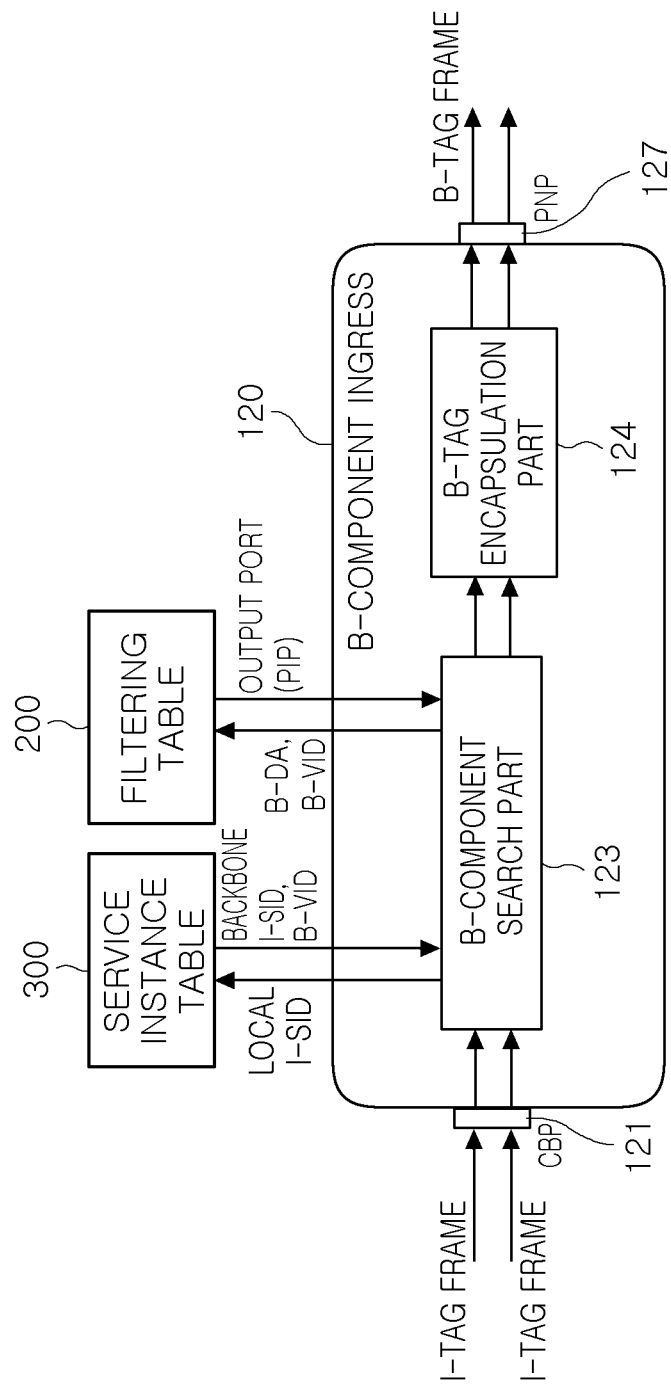

Referring to FIG. 5B, the B-component ingress 120 of this embodiment is different from the embodiment described with reference to FIG. 4B, in that the B-component ingress 120 of this embodiment receives an I-tag frame via a physical customer backbone port (CBP) 121, and outputs a B-tag frame via a physical PNP 127. Accordingly, unlike the previous embodiment, the B-component ingress 120, according to this embodiment of the invention, does not require a frame tag translation/integration part that performs mapping between virtual ports and physical ports.

Figure 5C:
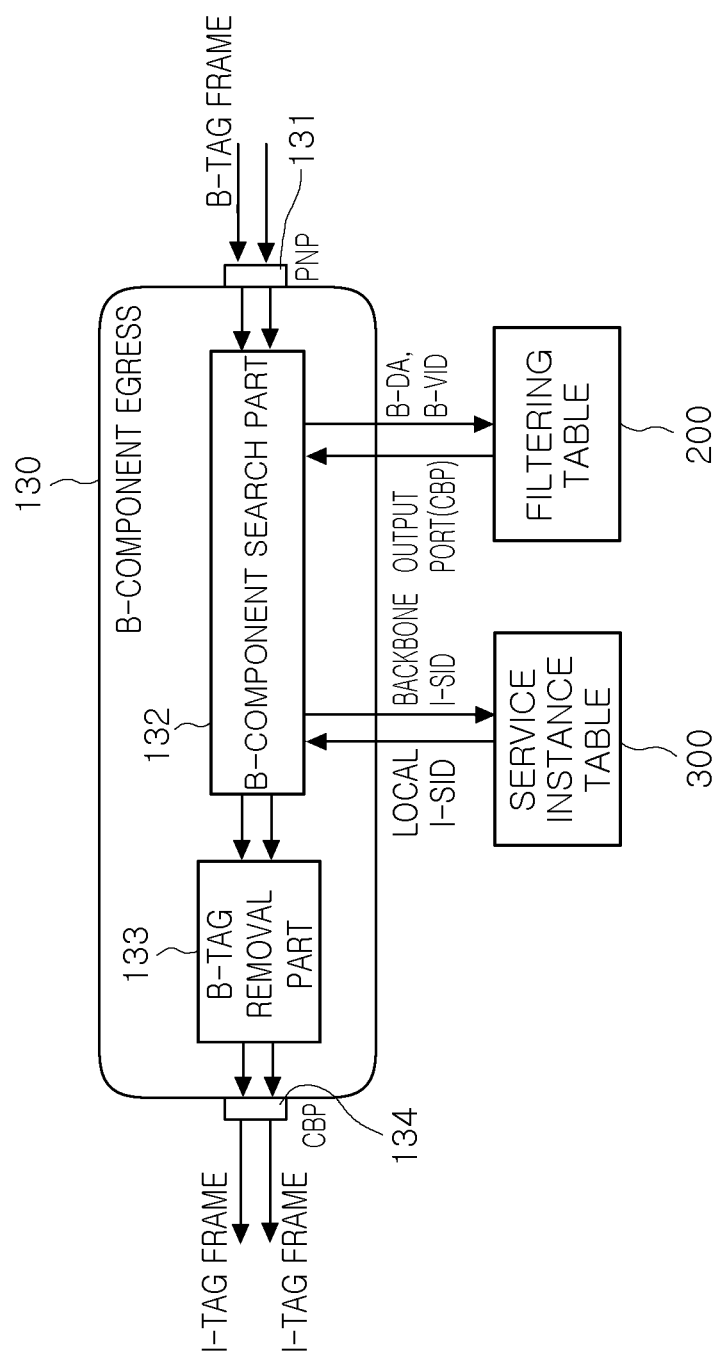

Referring to FIG. 5C, the B-component egress 130 of this embodiment is different from the previous embodiment described with reference to FIG. 4C, in that the B-component egress 130 outputs an I-tag frame via the physical CBP 134.

Figure 5D:
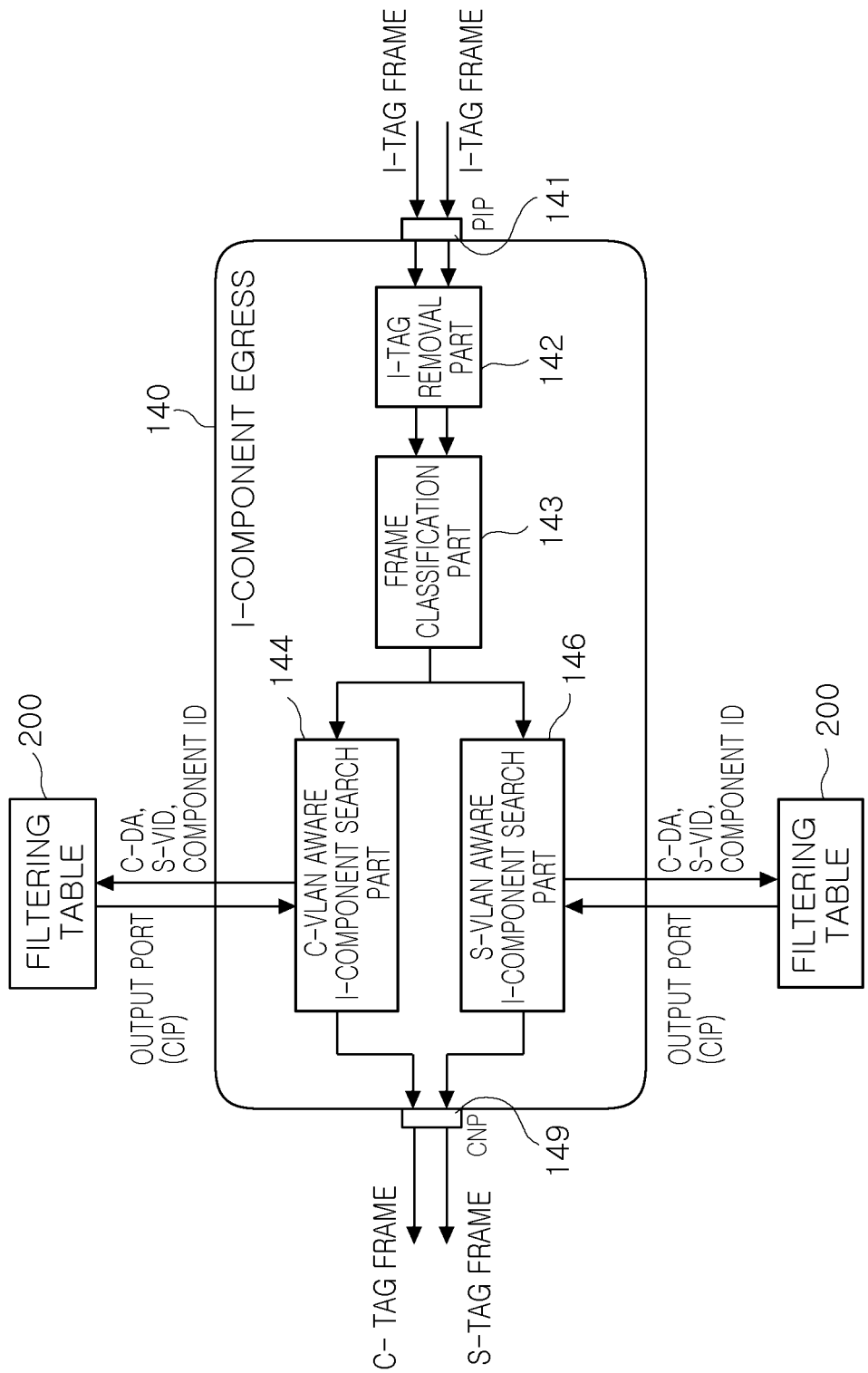

Referring to FIG. 5D, the I-component egress 140 receives a frame via a physical port (PIP), not via a virtual port, which is different from the previous embodiment described with reference to FIG. 4D.

In detail, the I-tag removal part 142 removes an I-tag from an I-tag frame inputted via the PIP 141, and then forwards it to the frame classification part 143.

The frame classification part 143 extracts a TPID value, a VLAN ID and a C-DA from the tag of the received frame, and classifies the frame by format using the TPID value. When determined to be a C-tag frame, the received frame is forwarded to the C-VLAN aware I-component search part 144. When determined to be an S-tag frame, the received frame is forwarded to the S-VLAN aware I-component search part 146.

The C-VLAN aware I-component search part 144 receives the C-tag frame from the frame classification part 143, and assigns a C-VLAN aware I-component to the C-tag frame as a component ID. Thereafter, the C-VLAN aware I-component search part 144 acquires information about an output port (CNP) by searching the filtering table 200 using the C-DA, the C-VID and the component ID, and outputs the C-tag frame via a corresponding output port.

The S-VLAN aware I-component search part 146 receives an S-tag frame from the frame classification part 143, and assigns an S-VLAN aware I-component to the S-tag frame as a component ID. Thereafter, the S-VLAN aware I-component search part 146 acquires information about an output port (CNP) by searching the filtering table 200 using the C-DA, the S-VID and the component ID, and outputs the S-tag frame via a corresponding output port.

Figure 6A:
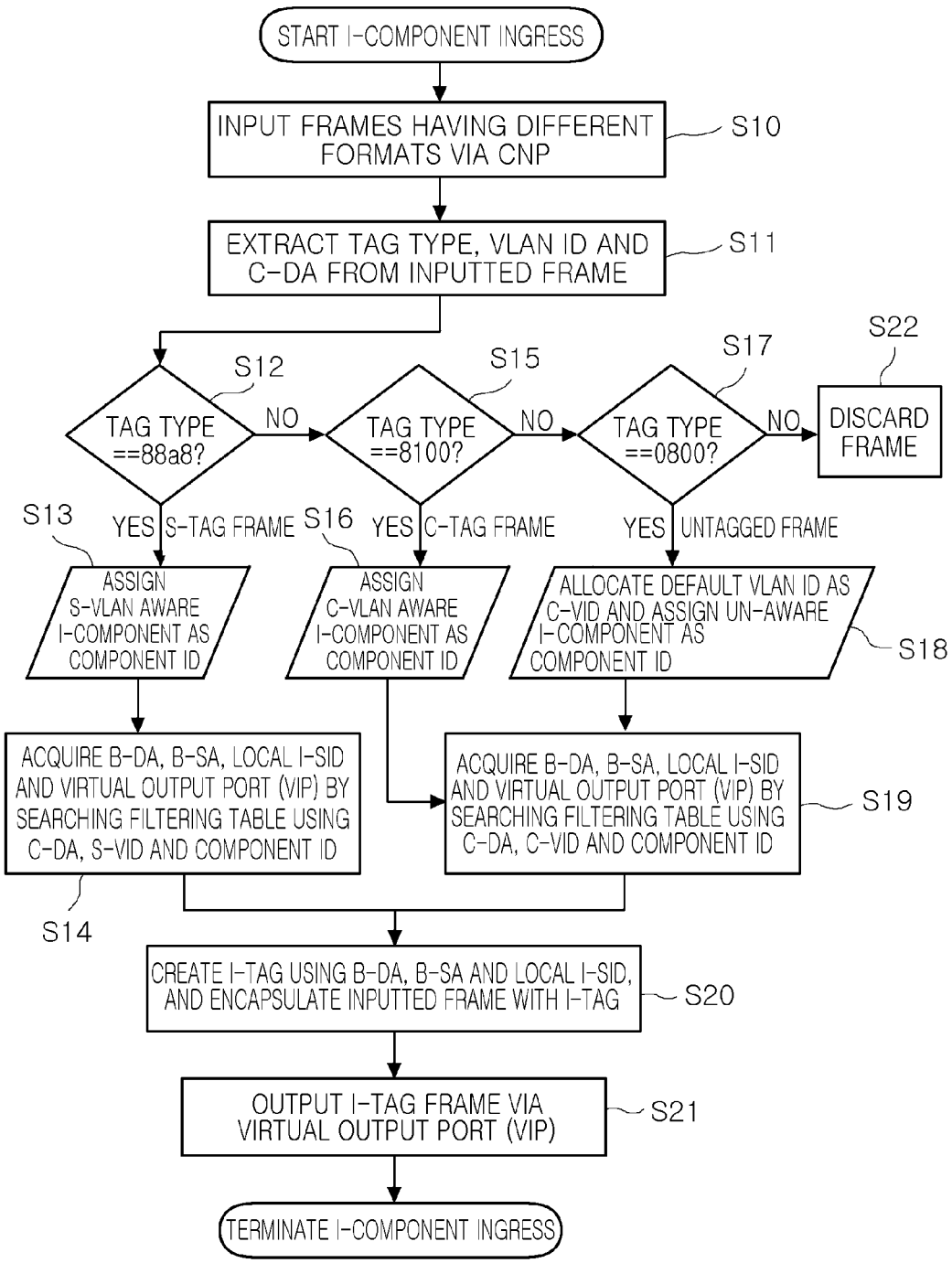
FIGS. 6A through 6E are flowcharts showing the process of packet processing, according to an exemplary embodiment of the present invention.
Figure 6B:
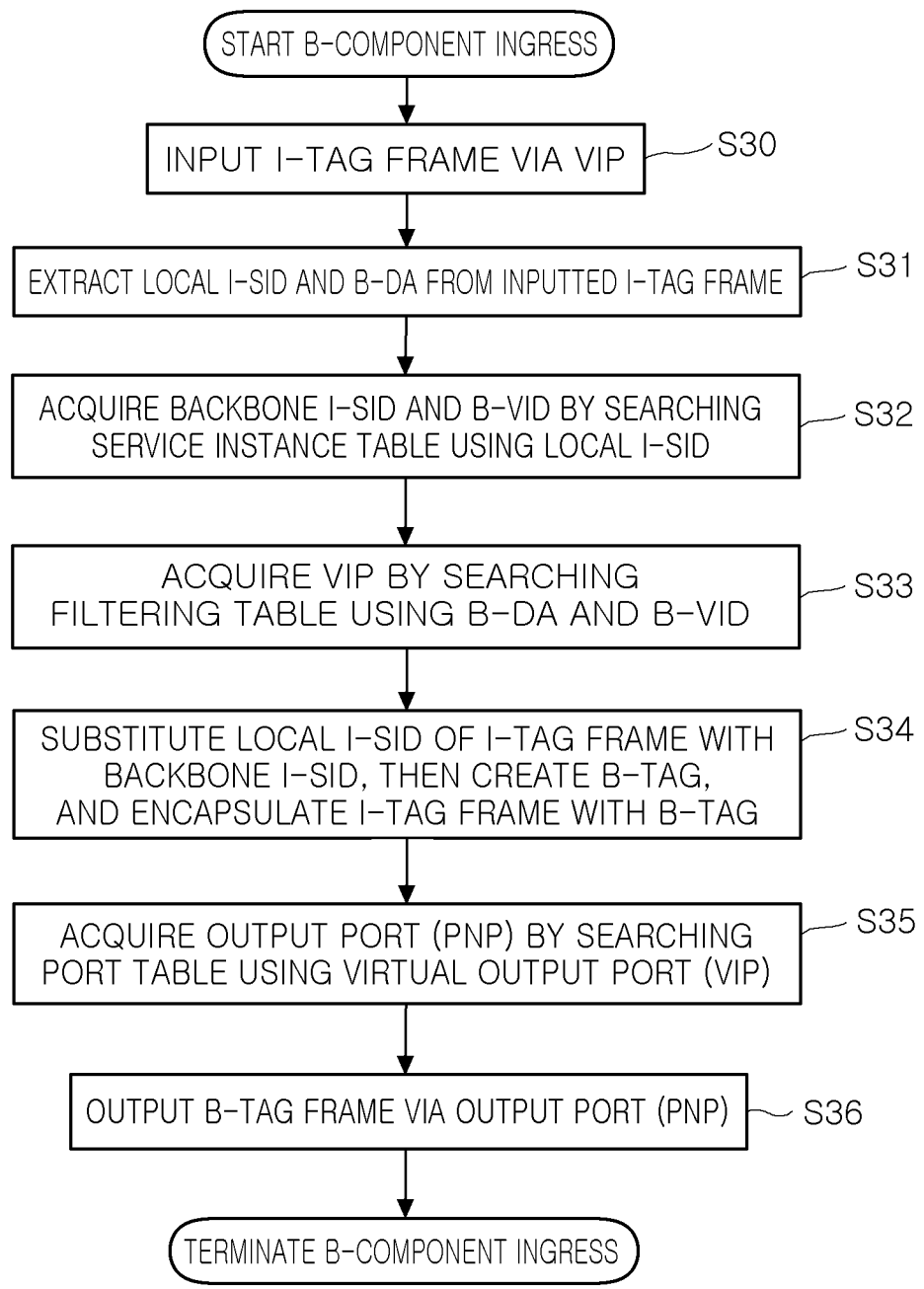
Figure 6C:
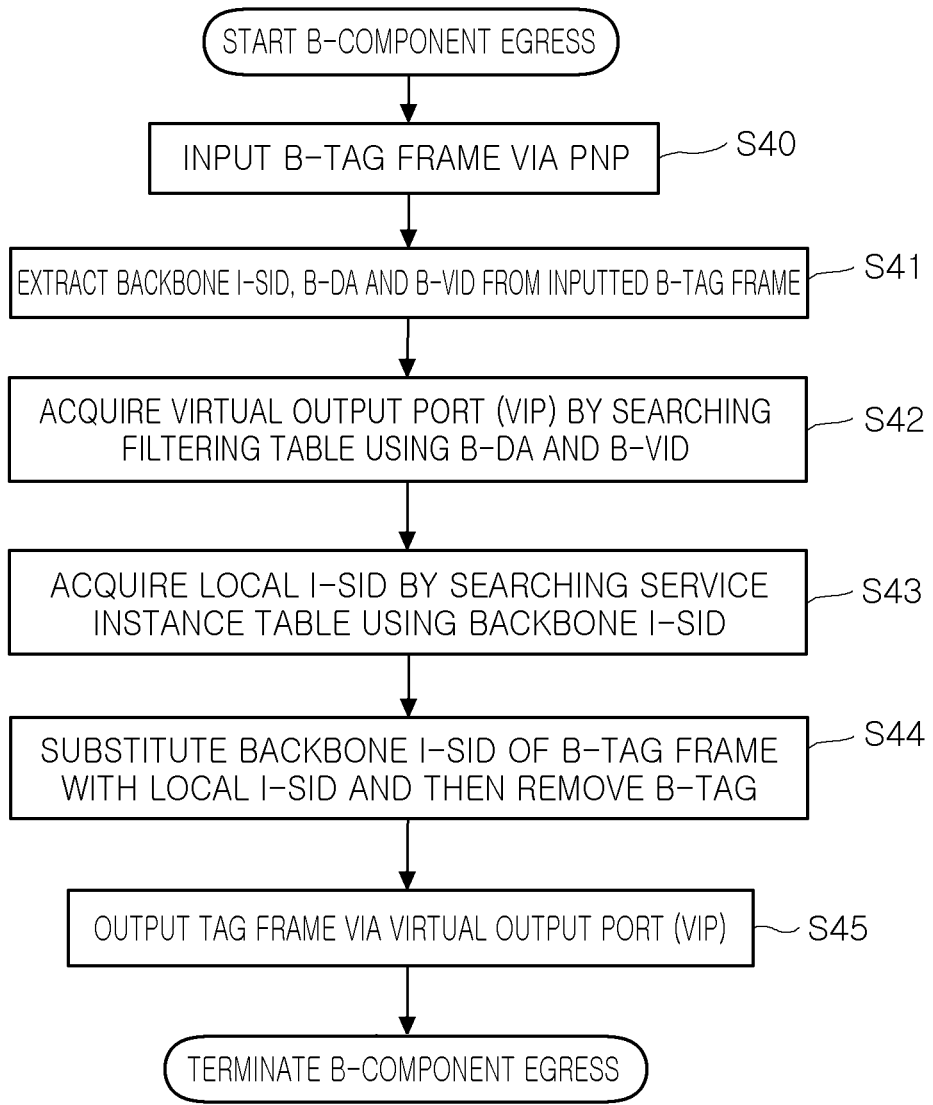
Figure 6D:
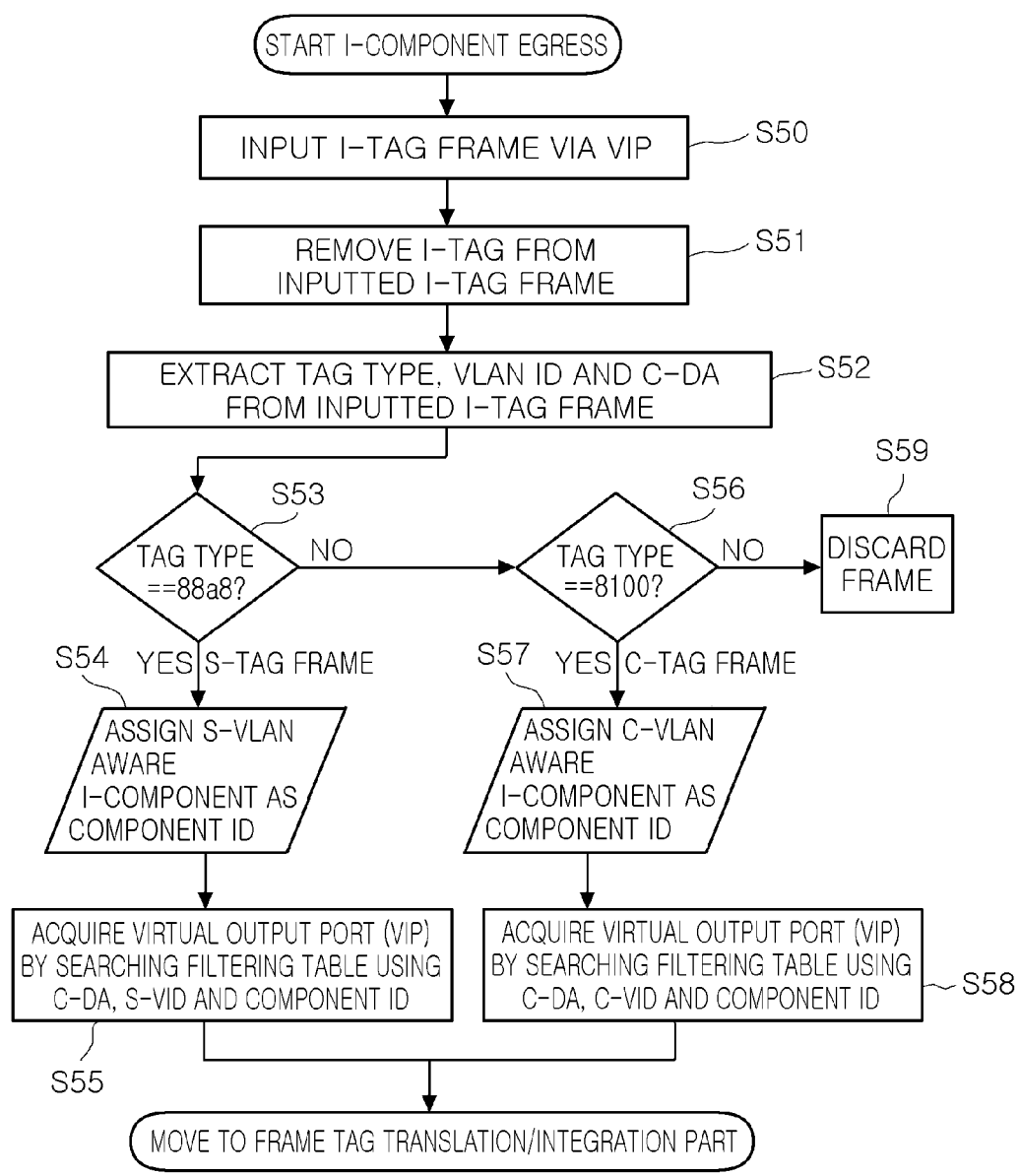
Figure 6E:
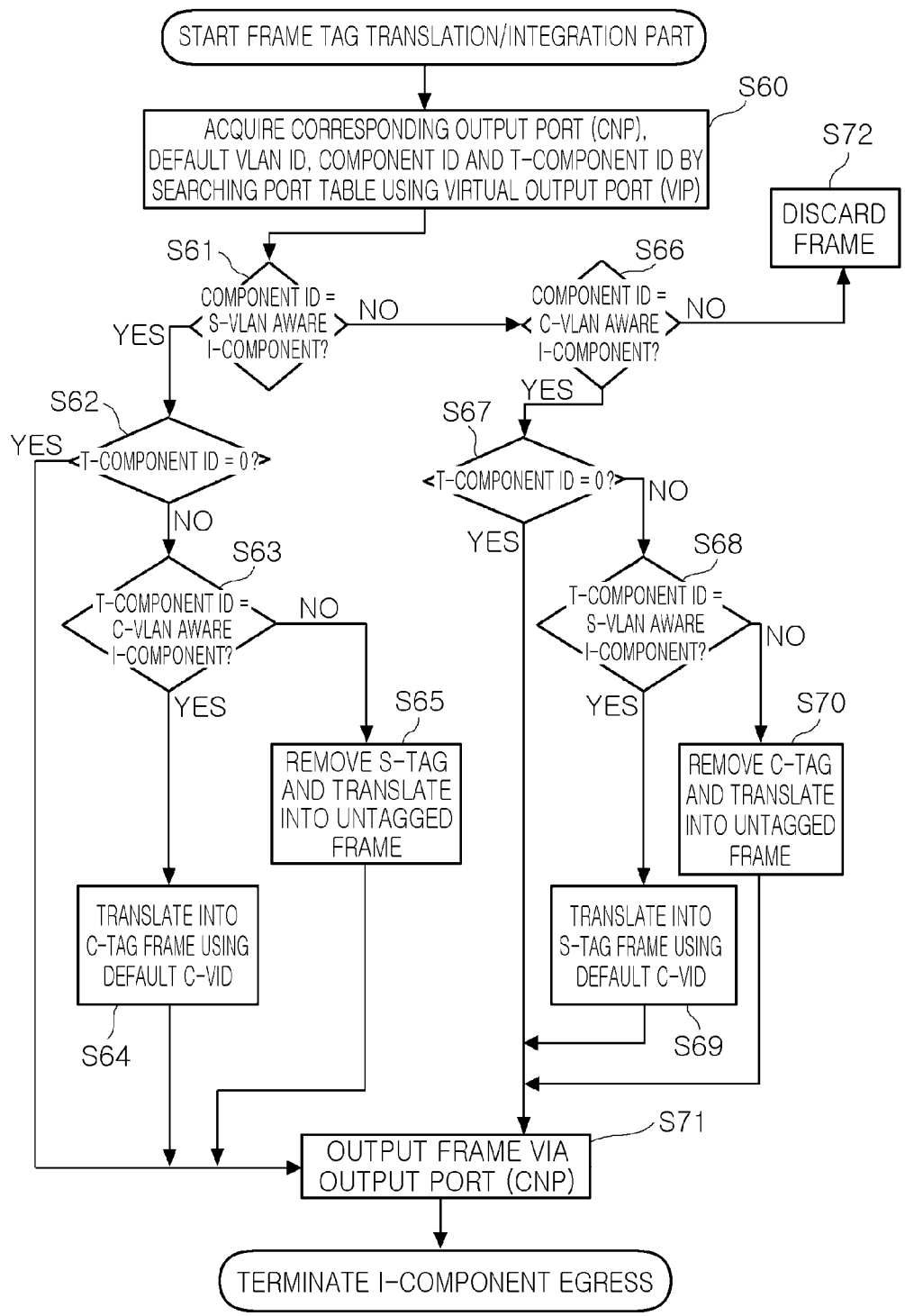

FIGS. 6A through 6E are flowcharts showing the process of packet processing according to an exemplary embodiment of the present invention. FIG. 6A illustrates a processing process in the I-component ingress, and FIG. 6B illustrates a processing process in the B-component ingress. FIG. 6C illustrates a processing process in the B-component egress, and FIGS. 6D and 6E illustrate a processing process in the I-component egress.

Referring to FIG. 6A, when frames having different formats are inputted via a CNP in operation S10, the frame classification part 112 extracts a TPID value indicating a tag type, a VLAN ID and a C-DA from an inputted frame in operation S11.

Thereafter, the inputted frame is classified by format using the TPID value. When the TPID value is 88a8 in operation S12, the inputted frame is classified as an S-tag frame, and an S-VLAN aware I-component is assigned to the inputted frame as a component ID in operation S13. Thereafter, the S-VLAN aware I-component search part 115 acquires information about a B-DA, a B-SA, a local I-SID and virtual output ports by searching the filtering table 200 using the C-DA, the S-VID and the component ID in operation S14.

In contrast, when the TPID value is 8100 in operation S15, the inputted frame is classified as a C-tag frame, and a C-VLAN aware I-component is assigned to the inputted frame as a component ID in operation S16. When the TPID value is 0800 in operation S17, the inputted frame is classified as an untagged frame, and an un-aware I component is assigned to the inputted frame as a component ID and a default VLAN ID is allocated thereto as a C-VID in operation S18. Thereafter, the C-VLAN aware I-component search part 113 acquires information about a B-DA, a B-SA, a local I-SID and virtual output ports by searching the filtering table 200 using the C-DA, the C-VID and the component ID in operation S19.

Thereafter, the I-tag encapsulation part 116 creates an I-tag using the B-DA, the B-SA, and the Local I-SID, and encapsulates the inputted frame with the I-tag in operation S20. Thereafter, the I-tag encapsulation part 116 outputs the I-tag frame via virtual output ports 117 and 118 in operation S21.

Referring to FIG. 6B, when an I-tag frame is inputted via virtual ports 121 and 122 in operation S30, the B-component search part 123 extracts a local I-SID and a B-DA from the inputted I-tag frame in operation S31.

Thereafter, the B-component search part 123 acquires information about a backbone I-SID and a B-VID by searching the service instance table 300 using the local I-SID, in operation S32. In operation S33, the B-component search part 123 acquires information about virtual output ports by searching the filtering table 200 using the B-DA and the B-VID.

Thereafter, the B-tag encapsulation part 124 substitutes the local I-SID of the I-tag frame, received from the virtual ports, with the backbone I-SID acquired by the B-component search part 123, then creates a B-tag, and encapsulates the I-tag frame with the B-tag in operation S34.

Thereafter, the frame tag translation/integration part 126 acquires information about a physical output port (PNP) by searching the port table 500 using the information about virtual output ports in operation S35, and then outputs a B-tag frame to a backbone core network via a physical output port in operation S36.

Referring to FIG. 6C, when a B-tag frame is inputted via a PNP 131 in operation S40, the B-component search part 132 extracts a backbone I-SID, a B-DA and a B-VID from the inputted B-tag frame in operation S41.

Thereafter, the B-component search part 132 acquires information about virtual output ports (VIP) by searching the filtering table 200 using the B-DA and the B-VID in operation S42, and acquires a local I-SID by searching the service instance table 300 using the backbone I-SID in operation S43.

Thereafter, the B-tag removal part 133 substitutes the backbone I-SID of the B-tag frame, received from the PNP, with the local I-SID acquired by the B-component search part 132, and then translates the received B-tag frame into an I-tag frame by removing a B-tag in operation S44. Then, the B-tag removal part 133 outputs the I-tag frame via a virtual output port 134 in operation S45.

Referring to FIGS. 6D and 6E, when an I-tag frame is inputted via a VIP 141 in operation S50, the I-tag removal part 142 removes an I-tag from the inputted I-tag frame in operation S51, and forwards it to the frame classification part 143.

Thereafter, the frame classification part 143 extracts a TPID value (tag type), a VLAN ID and a C-DA from the inputted I-tag removed frame in operation S52, and classifies the inputted frame by format using the TPID value.

In detail, when the TPID value is 88a8 in operation S53, the inputted frame is classified as an S-tag frame, and an S-VLAN aware I-component is assigned to the inputted frame as a component ID in operation S54. Thereafter, the S-VLAN aware I-component search part 146 acquires information about virtual output ports by searching the filtering table 200 using the C-DA, S-VID and component ID in operation S55.

When the TPID value is 8100 in operation S56, the inputted frame is classified as a C-tag frame, and a C-VLAN aware I-component is assigned to the inputted frame as a component ID in operation S57. Thereafter, the C-VLAN aware I-component search part 144 acquires information about virtual output ports by searching the filtering table using the C-DA, the C-VID and the component ID in operation S58.

Thereafter, in operation 60, the frame tag translation/integration part 148 acquires information about a default VLAN ID, a component ID, a T-component ID and a corresponding output port (CNP) by searching the port table using the information about virtual output ports.

Thereafter, the frame tag translation/integration part 148 translates the format of the received frame appropriately according to the component ID and the T-component ID, and outputs it via an output port 149.

In detail, when the T-component ID is zero regardless of the format of the received format in operation S62 or S67, the received frame is outputted via an output port (CNP) without the translation of the format in operation S71.

In the case that the component ID is the S-VLAN aware I-component in operation S61, when the T-component ID is the C-VLAN aware I-component in operation S63, an S-tag frame is translated into a C-tag frame by using a default C-VID, and the C-tag frame is outputted in operation S64. When the T-component ID is not a C-VLAN aware I-component, the T-component ID corresponds to an un-aware I-component. Thus, the received frame is translated into an untagged frame by removing an S-tag, and the untagged frame is outputted in operation S65.

In the case that the component ID is a C-VLAN aware I-component in operation S66, when the T-component ID is an S-VLAN aware I-component in operation S68, a C-tag frame is translated into an S-tag frame by using a default S-VID in operation S69. When the T-component ID is not an S-VLAN aware I-component, the T-component ID corresponds to an un-aware I-component, thus the received frame is translated into an untagged frame by removing a C-tag, and the untagged frame is outputted in operation S70.

As set forth above, according to exemplary embodiments of the invention, frames having different formats can be received simultaneously by a single physical port and delivered to a backbone core network, and frames sent from the backbone core network can be translated into appropriate frame formats corresponding to the kind of network connected to the edge. Accordingly, the flexibility required in network design and construction can be improved.

In addition, a component ID is assigned according to each frame format, and serves as a factor used in searching the filtering table. This allows the number of VLAN IDs, C-VIDs and S-VIDs each having 12 bits, to reach as many as 4096, respectively. Accordingly, network extensibility can be improved due to the increase in the number of C-VLANs and S-VLANs being usable at the same time.

While the present invention has been shown and described in connection with the exemplary embodiments, it will be apparent to those skilled in the art that modifications and variations can be made without departing from the spirit and scope of the invention as defined by the appended claims.

What is claimed is:

1. A packet transport layer apparatus comprising:
an I-component ingress to receive frames having different formats via a single first customer network port (CNP), assign a component identifier (ID) to a received frame according to a format of the received frame, and output an ingress I-tag frame via a first virtual output port by encapsulating the received frame with an ingress I-tag;
a B-component ingress to output an ingress B-tag frame via a first physical output port (PNP) by encapsulating, with an ingress B-tag, the ingress I-tag frame received from the I-component ingress via a first virtual input port;
a B-component egress to translate an egress B-tag frame, received via a second PNP, into an egress I-tag frame by removing an egress B-tag, and then output the egress I-tag frame via a second virtual output port; and
an I-component egress to remove an egress I-tag from the egress I-tag frame received from the B-component egress via a second virtual input port, assign a component ID to the egress I-tag removed frame according to a format of the egress I-tag removed frame, translate a format of the egress I-tag removed frame according to the component ID and a T-component ID, and output the format-translated frame via a second CNP,
wherein the 1-component ingress comprises:
a frame classification part to classify a frame, received via the first CNP, according to a format of the frame, and forward the frame to any one of a customer virtual local area network (C-VLAN) aware I-component search part, an un-aware I-component search part and a service virtual LAN (S-VLAN) aware I-component search part;
the C-VLAN aware 1-component search part to receive a C-tag frame from the frame classification part and assign a C-VLAN aware 1-component to the C-tag frame as a component ID, receive a C-tag frame tagged with a default VLAN ID from the un-aware 1-component search part, and acquire information about the first virtual output port by searching a filtering table;
the un-aware 1-component search part to receive an untagged frame from the frame classification part, assign an un-aware I component to the untagged frame as a component ID, and allocate a default VLAN ID thereto as a C-VLAN ID (C-VID);
the S-VLAN aware 1-component search part to receive an S-tag frame from the frame classification part, assign an S-VLAN aware I-component to the S-tag frame as a component ID, and acquire information about the first virtual output port by searching the filtering table; and
an I-tag encapsulation part to create an I-tag, and tagging a frame with the I-tag, the frame being received from the C-VLAN aware I-component search part or the S-VLAN aware I-component search part.

2. The packet transport layer apparatus of claim 1, wherein the filtering table includes a component ID field, and has information about at least one of the first PNP, the second PNP, the first CNP, and the second CNP or at least one of the first virtual output port and the second virtual output port in a port number field.

3. The packet transport layer apparatus of claim 1, wherein the component ID serves as a search factor used in searching the filtering table.

4. A packet transport layer apparatus comprising:
an I-component ingress to receive frames having different formats via a single first customer network port (CNP), assign a component identifier (ID) to a received frame according to a format of the received frame, and output an ingress I-tag frame via a first virtual output port by encapsulating the received frame with an ingress I-tag;

a B-component ingress to output an ingress B-tag frame via a first physical output port (PNP) by encapsulating, with an ingress B-tag, the ingress I-tag frame received from the I-component ingress via a first virtual input port;

a B-component egress to translate an egress B-tag frame, received via a second PNP, into an egress I-tag frame by removing an egress B-tag, and then output the egress I-tag frame via a second virtual output port; and an I-component egress to remove an egress I-tag from the egress I-tag frame received from the B-component egress via a second virtual input port, assign a component ID to the egress I-tag removed frame according to a format of the egress I-tag removed frame, translate a format of the egress I-tag removed frame according to the component ID and a T-component ID, and output the format-translated frame via a second CNP, wherein the 1-component egress comprises:

an I-tag removal part to remove the egress I-tag from the received I-tag frame;

a frame classification part to classify the frame received from the I-tag removal part according to a format of a frame, received from the I-tag removal part and forward the classified frame to a customer virtual local aware network (C-VLAN) aware I-component search part or a service virtual LAN (S-VLAN) aware I-component search part;

the C-VLAN aware I-component search part to receive a C-tag frame from the frame classification part, assign a C-VLAN aware 1-component to the C-tag frame as a component ID, and acquire information about virtual output ports by searching a filtering table;

the S-VLAN aware I-component search part to receive an S-tag frame from the frame classification part, assign an S-VLAN aware I-component to the S-tag frame as a component ID, and acquire information about virtual output ports by searching the filtering table; and a frame tag translation/integration part to receive the C-tag frame or the S-tag frame from the C-VLAN aware I-component search part or the S-VLAN aware I-component search part respectively, acquire information about a T-component ID and the second CNP by searching a port table, translate a format of the C-tag frame or the S-tag frame according to the component ID and the T-component ID, and output the format-translated frame.

5. The packet transport layer apparatus of claim 4, wherein the frame tag translation/integration part outputs the received frame without translating the format of the frame when the T-component ID is zero;

in the case that the component ID is an S-VLAN aware I-component, the frame tag translation/integration part translates the received frame into a C-tag frame and outputs the C-tag frame when the T-component ID is a C-VLAN aware I-component, and translates the received frame into an untagged frame and outputs the untagged frame when the T-component ID is not a C-VLAN aware I-component; and in the case that the component ID is a C-VLAN aware I-component, the frame tag translation/integration part translates the received frame into an S-tag frame and outputs the S-tag frame when the T-component ID is an S-VLAN aware I-component, and translates the received frame into an untagged frame and outputs the untagged frame when the T-component ID is not an S-VLAN aware I-component.

* * * * *